United States Patent Office 3,177,560
Patented Apr. 13, 1965

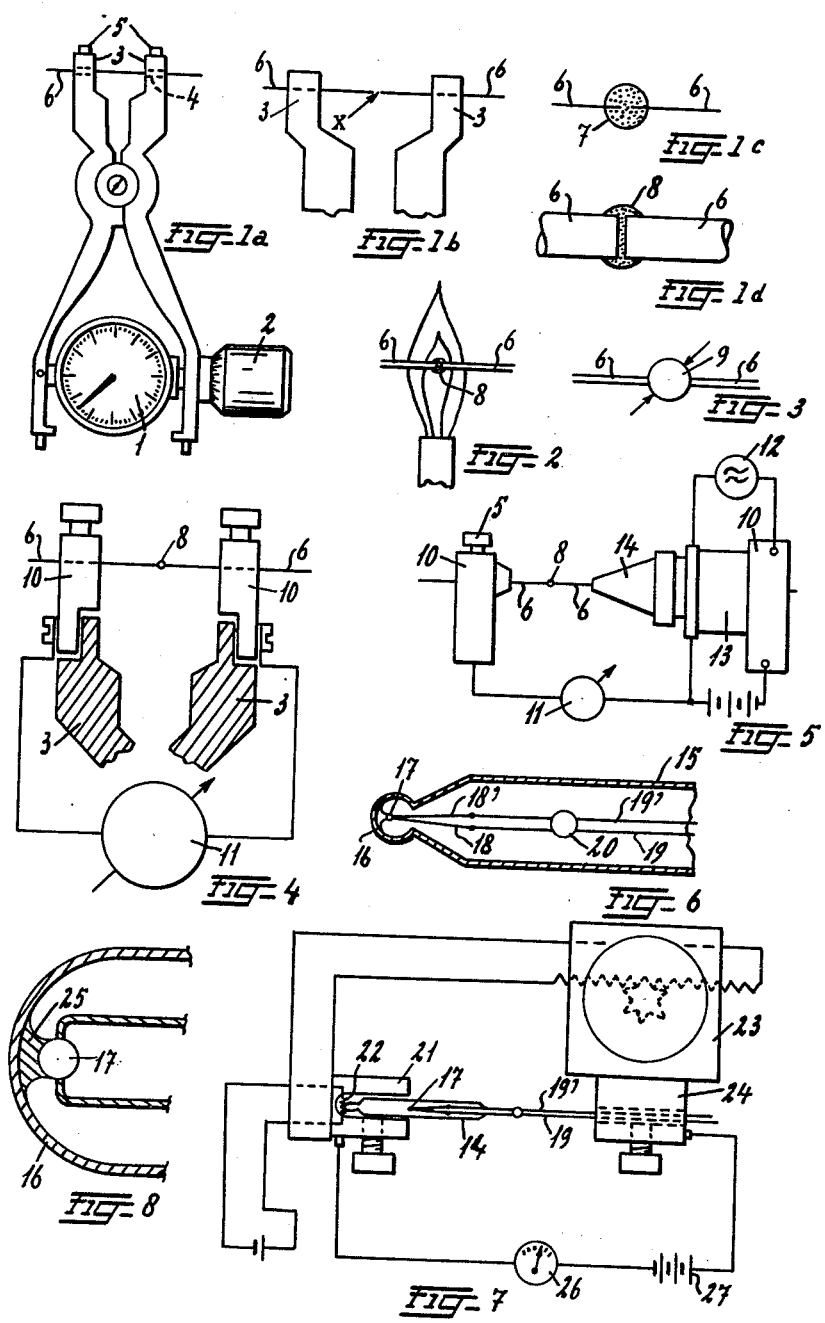

3,177,560
PROCESS FOR PRODUCING A THERMISTOR
Alexis Argamakoff, 29 Ave. E. Renan,
Schaerbeek, Belgium
Filed Dec. 28, 1960, Ser. No. 78,987
Claims priority, application Belgium, Dec. 28, 1959,
464,987
10 Claims. (Cl. 29—155.5)

The invention relates to thermistors, and in particular to a process for producing thermistors of extremely small size.

In many cases, in particular where the temperature of a solid body is to be measured without an undue loss of time, it would be highly desirable to make use of a thermistor of great stability of which the dimensions are as small as possible.

Up to now, thermistors are made irrespective of their dimensions by a sintering process, wherein the materials of which the thermistor is to be made the simultaneously exposed to a high pressure and a high temperature. This sintering process leads to a sufficient thermal diffusion to obtain the required consistency of the material and the desired degree of temperature sensitivity. However, upon aging of the thermistor, numerous stresses and even cracks are brought about by recrystallization processes, so that the electric properties are found to be unstable as a function of time. These fluctuations of the electric properties are particularly pronounced in thermistors of small dimensions.

Moreover, the known process only allows for the production of molded spherical thermistors up to a certain minimum diameter, at which the difficulties of molding and of attaching electrodes to the thermistor become unsurmountable.

It is accordingly an object of the invention to provide thermistors with stable electric properties of very small dimensions, for instance with a diameter as small as 0.0004".

It is another object of the invention to provide a process for producing small thermistors, wherein tensions in the material due to recrystallization are substantially avoided.

A further object of the invention is to provide a novel process for producing thermistors, wherein use is made of the considerable surface tensions and capillary forces occurring in a molten semi-conductive material to form a small spherical semi-conductive body between two conducting electrodes.

A still further object of the invention is to provide a process for producing a temperature feeler adapted to be used for very accurate measurements.

Further objects and advantages of the invention will appear from the following description given with reference to the accompanying drawings—

FIG. 1a shows a special pair of tongs to be used in the process according to the invention.

FIG. 1b shows a part of the same tongs, a wire clamped in the tongs being cut at $x$.

FIG. 1c shows how a drop of a semi-conductive material suspended in a liquid is deposited on the ends of two juxtaposed conductors.

FIG. 1d shows the same parts after evaporation of the carrier liquid in which the semi-conductive material was suspended.

FIG. 2 shows how the conductors and the semi-conductive material deposited thereon are subjected to the action of a flame.

FIG. 3 shows the thermistor obtained by the flame treatment.

FIG. 4 shows a modification of the tongs shown in FIG. 1a, which allows for an adjustment of the desired properties of the thermistor to be produced by electric means.

FIG. 5 shows a device for performing the process according to the invention wherein use is made of supersonic vibrations.

FIG. 6 shows a temperature feeler made by means of the process according to the invention.

FIG. 7 shows a device for producing the feeler shown in FIG. 6.

FIG. 8 shows a detail of the feeler shown in FIG. 6.

The tongs shown in FIG. 1a are provided with a micrometer arranged between the legs, and adjustable by means of a screw 2. The jaws 3 of the tongs are each provided with a bore 4 and a clamping screw 5, by means of which a wire 6, made of platinum, or preferably of platinum-iridium, may be clamped in the tongs. After the wire has been clamped by means of the screws 5, and stretched to a sufficient extent by means of the screw 2, the wire is cut at $x$ (FIG. 1b). In this manner, two separate conductive elements are obtained, which are in end to end relation and spaced from each other by a small distance.

As shown in FIG. 1c, a drop 7 of a semi-conductive material suspended in a liquid is deposited on the adjacent ends of the two conductive elements. FIG. 1d shows the same parts after evaporation of the carrier liquid in which the semi-conductive material was suspended; a small amount 8 of the semi-conductive material is now to be found between the two conductive elements. Thereafter, the two conductive elements, and the semi-conductive material deposited thereon are subjected to the action of a flame, as shown in FIG. 2.

In order to attain the desired effect, there are two conditions to be satisfied, to wit:

(a) The semi-conductive material must present a sufficient adhesion to the electrodes to resist the action of the flame before the fusion;

(b) The melting point of the semi-conductive material must be lower than the temperature of the flame.

The last-mentioned condition is not satisfied for some of the metal oxides used as semi-conductors, so that it is often necessary to decrease the melting point artificially.

The first-mentioned condition may be satisfied by grinding the semi-conductive material to a very fine powder, and by suspending this powder in a suitable liquid, such as ditsilled water, glycerine, or certain oils. If a drop of such a suspension is deposited between the electrodes, taking care that the drops always have substantially the same dimensions, a small, but accurately defined amount of the semi-conductive material is left between the electrodes after evaporation of the carrier liquid; of course, this amount is dependent on the concentration of the suspension. In order to subject this semi-conductive material to the action of a flame, it suffices to bring the electrodes into a relatively small flame of which the temperature is high enough to melt the semi-conductive material. By the fusion, the semi-conductive material is attached to the two conductors, and takes a regular spherical or oval shape, according to the interaction of surface tensions and capillary forces.

If the temperature of the flame cannot be increased above the melting point of the semi-conductive material, the melting point must be artificially lowered. For this purpose, the pure semi-conductive material, such as uranium, magnesium, aluminium or titanium oxide, is combined with a very small quantity of a different metal oxide. For instance, in the case of uranium oxide, having a very high melting point, the required reduction may be obtained by the addition of a few percent by weight of iron or titanium oxide.

By this reduction of the melting point, it is made possible to apply the present invention to semi-conductive materials with a very high melting point, such as aluminium, nickel or vanadium oxide, which could otherwise only be treated by a sintering process.

After the flame treatment, the semi-conductive material generally has the shape of a perfect sphere 9 (FIG. 3) with a minimum diameter of about 0.0004", which is substantially free from pores and structural irregularities.

In many cases, the capillary adhesive force between the semi-conductive material and the conductors is so large, that the ends of the conductors are brought into contact with each other within the sphere, so as to cause a short-circuit. This phenomenon may be avoided by increasing the distance between the two parts of the platinum wire at the moment of fusion of the semi-conductive material by means of the screw 2. This may be done with great accuracy with the aid of the micrometer 1. Due to the constant distance between the electrodes within the semi-conductive mass, which is obtained in this manner, the ohmic resistance of the semi-conductors as produced is substantially constant.

The distance between the electrodes within the semi-conductive sphere may also be determined by an electric measurement of the ohmic resistance of the fused semi-conductive mass, as shown in FIG. 4. For this purpose, the tongs are made of an insulating material and provided with metallic jaws 10, which are interconnected through a measuring instrument 11. With the aid of the screw 2, the instrument 11 is adjusted to a predetermined value at the moment of fusion of the semi-conductive material. Although the resistance of the molten material is largely different from the resistance of the semi-conductive material in its cold state, it is possible to attain a constant resistance in the cold state in this manner.

As stated hereinbefore, it is of great importance to avoid the occurrence of stresses in the material due to recrystallization. For this reason, it is very useful to subject the semi-conductive material to supersonic vibrations in the manner as shown in FIG. 5.

In the arrangement of FIG. 5, the tongs are combined with a supersonic vibrator 13, fed by an oscillator 12. The vibrator may be of any desired type, such as a magnetostrictive or a piezoelectric vibrator; in the latter case, barium titanate is a very useful material. One of the electrodes 6 is attached to the head 14 of the vibrator, which has a conical shape in order to amplify the vibrations.

The thermistor is made in the above-described manner, except that the oscillator 12 is operated during the melting and cooling of the semi-conductive material. The vibrations amplified by the head 14 pass along the wire 6 and influence the semi-conductive material 8 during and after the melting process. This does not only cause a removal of mechanical stresses, but also a degassing of the semi-conductive material.

FIG. 6 shows a temperature feeler incorporating a thermistor made by means of the present process. The feeler comprises a metallic tube 15, provided at its end with a silver cap 16, in which a thermistor 17 of the above-described type is arranged. The leads 18 and 18' of the thermistor are soldered to the conductors 19 and 19', which are supported by an isolator 20.

In the manufacture of the feeler shown in FIG. 6, the silver cap 16 is kept into contact with a heating resistor 22 (FIG. 7) by means of a clamp schematically shown at 21. By means of a micrometric screw 23, a second clamp 24, in which the conductors 19 and 19' have been clamped, may be moved towards the clamp 22, until the thermistor 17 is in the immediate vicinity of the wall of cap 16.

A glass bead 25 (FIG. 8) is attached to the thermistor 17, so as to be fused by the heating resistor 22, such that the glass bead will be formed into a flat body having a thickness of the order of 0.0004". The thickness of this body may be accurately determined with the aid of a measuring instrument 26, indicating the current supplied by a source 27 through the thermistor 17, the cap 16 and the glass bead 25. The thermistor is pushed into the tube with the bead liquefied until the magnitude of the current reaches a minimum, which indicates that the thermistor has come into contact with the metal cap. The thermistor is then slightly withdrawn, until the magnitude of the current has reached a predetermined value, corresponding to the required thickness of the bead. In this manner, great accuracy and perfect adhesion of the thermistor to the tube are obtained.

Although the invention has been described hereinbefore by reference to some specific embodiments thereof, it is to be understood that the invention is not restricted to these embodiments which may be modified and altered in various ways within the scope of the invention as set forth in the claims.

I claim:
1. A process for producing a thermistor of relatively small size comprising the steps of mixing thermistor material with a liquid so as to obtain a liquid suspension, coaxially arranging two conductive elements having ends spaced from one another to define a gap depositing a drop of said liquid suspension on said ends of the conductive elements to span the gap between said ends, allowing the liquid to evaporate to leave the thermistor material to span the gap between the ends of the conductive elements, and thereafter heating the said ends and the thermistor material deposited thereon to melt the thermistor material whereby the same assumes a spherical shape, and allowing said thermistor material to harden in said spherical shape whereby said ends and said thermistor material are united into an integral assembly.

2. A process for producing a thermistor of relatively small size comprising the steps of mixing thermistor material with a liquid so as to obtain a liquid suspension, stretching a conductive wire between two clamping members, cutting the stretched wire so as to obtain two conductive elements coaxially arranged with adjacent ends spaced at a small distance from each other, depositing a drop of said liquid suspension on the said ends spanning the space between the ends, heating the said ends and the thermistor material deposited thereon subsequent to evaporation of said liquid from said ends to fuse said thermistor material to said ends.

3. A process as claimed in claim 2, further comprising the step of measuring the distance between the said conductive elements, and adjusting the said distance to a predetermined value while said ends and suspension are heated and said suspension is liquefied.

4. A process as claimed in claim 3, wherein the said distance is measured with the aid of mechanical measuring means arranged between the said clamping members.

5. A process as claimed in claim 3, wherein the said distance is measured by passing an electric current through the two conductive elements, the thermistor material deposited on the same, and a current measuring instrument, and wherein the said distance is adjusted so as to obtain a predetermined value of said electric current.

6. A process as claimed in claim 5, wherein the said measurement is performed during the heating step.

7. A process for producing a thermistor of relatively small size, comprising the steps of mixing a thermistor material with a liquid so as to obtain a liquid suspension, coaxially arranging two conductive elements in end to end relation with a small gap between the ends of the elements, depositing a drop of said liquid suspension on the spaced ends of the conductive elements to span said gap, evaporating the liquid to leave the thermistor material to span the gap between the ends of the conductive elements, heating the ends and the thermistor material deposited thereon subsequent to evaporation of said liquid from said drop to a temperature sufficient to fuse the said thermistor material and the said conductive elements into an integral assembly, cooling the said assembly, said semi-conductive material being subjected to supersonic vibrations during the heating and cooling steps.

8. A process for producing a thermistor of relatively small size, comprising the steps of mixing uranium oxide with a small percentage of an oxide selected from the group consisting of iron oxide and titanium oxide to provide a mixture having a melting point lower than that of said uranium oxide alone, mixing said mixture in a liquid to form a liquid suspension, coaxially arranging two conductive elements in spaced end to end relation, depositing a drop of said liquid suspension on the said ends and spanning the space therebetween, evaporating the liquid and heating the said ends and the suspension deposited thereon subsequent to evaporation of said liquid from said drop to a temperature sufficient to fuse said mixture to said conductive elements.

9. A process as claimed in claim 8, wherein the liquid in which the semi-conductive material is suspended is selected from the group consisting of distilled water, glycerine, mineral oils and organic oils.

10. A process for producing a temperature feeler, comprising the steps of mixing thermistor material with a liquid so as to obtain a liquid suspension, coaxially arranging two conductive elements in end to end relation with a small gap between their ends, depositing a drop of said liquid suspension on the spaced ends of the conductive elements spanning said gap, heating the said ends and the suspension deposited thereon subsequent to evaporation of said liquid from said drop to a temperature sufficient to fuse the thermistor material and the said conductive elements into an integral assembly, fusing a glass bead to said thermistor material, pushing the assembly into a tube closed at one of its ends by a metal cap until said glass bead abuts said metal cap, heating said metal cap so as to melt said glass bead, passing an electric current through said thermistor material, said glass bead, said metal cap and a current measuring instrument, and adjusting the distance between said thermistor material and said metal cap so as to obtain a predetermined value of said electric current corresponding to a predetermined spacing between said thermistor material and said metal cap and allowing the glass bead to cool to adhere to the cap.

References Cited by the Examiner

UNITED STATES PATENTS

| | | | |
|---|---|---|---|
| 1,972,411 | 9/34 | Swartz et al. | 29—155.62 |
| 2,253,577 | 8/41 | Pearson | 29—155.69 |
| 2,282,944 | 5/42 | Dearborn | 338—23 |
| 2,382,187 | 8/45 | Vang. | |
| 2,609,644 | 9/52 | Brown | 324—62 |
| 2,664,468 | 12/53 | Colpetts | 338—22 |
| 2,669,770 | 2/54 | Brewer | 29—155.5 |
| 2,799,051 | 7/57 | Coler | 324—62 |
| 2,799,758 | 7/57 | Hutchins | 338—22 |
| 2,816,997 | 12/57 | Conrad | 338—22 |

FOREIGN PATENTS 638,436    6/50    Great Britain.

JOHN F. CAMPBELL, *Primary Examiner.*

WHITMORE A. WILTZ, *Examiner.*